United States Patent
Alvarez Valenzuela et al.

(10) Patent No.: US 12,463,551 B2
(45) Date of Patent: Nov. 4, 2025

(54) HYSTERETIC CONTROL USING ARM CURRENT AND ERROR VOLTAGE IN A MODULAR MULTILEVEL CONVERTER

(71) Applicant: Siemens Energy Global GmbH & Co. KG, Munich (DE)

(72) Inventors: Rodrigo Alonso Alvarez Valenzuela, Nuremberg (DE); Kilian Dallmer-Zerbe, Bubenreuth (DE); Diego Alberto Roman Marcos, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 389 days.

(21) Appl. No.: 18/161,998

(22) Filed: Jan. 31, 2023

(65) Prior Publication Data

US 2023/0246567 A1 Aug. 3, 2023

(30) Foreign Application Priority Data

Jan. 31, 2022 (EP) .................................... 22154134

(51) Int. Cl.
*H02M 7/483* (2007.01)
*H02M 1/00* (2006.01)

(52) U.S. Cl.
CPC ....... *H02M 7/4835* (2021.05); *H02M 1/0054* (2021.05); *H02M 7/4833* (2021.05)

(58) Field of Classification Search
CPC .................................................. H02M 7/4835
See application file for complete search history.

(56) References Cited

U.S. PATENT DOCUMENTS 11,277,076 B2   3/2022 Dallmer-Zerbe et al.
2019/0338753 A1* 11/2019 Biris .................. H02M 7/4835

FOREIGN PATENT DOCUMENTS

EP        3317959 B1   9/2019
EP        3713073 A1   9/2020
WO   WO 2018099552 A1   6/2018

OTHER PUBLICATIONS

"Tolerance Band Modulation Methods for Modular Multilevel Converters" by Hassanpoor et al (A. Hassanpoor, L. Ängquist, S. Norrga, K. Ilves and H.) in IEEE Transactions on Power Electronics, vol. 30, No. 1, pp. 311-326, Jan. 2015 (Year: 2015).*

(Continued)

*Primary Examiner* — Peter M Novak
(74) *Attorney, Agent, or Firm* — Laurence A. Greenberg; Werner H. Stemer; Ralph E. Locher

(57) ABSTRACT

A method operates a power converter having at least one series circuit of switching modules, which each have semiconductor switches and an energy store. In which method a switching frequency of the switching modules is controlled by tolerance based modulation, and the forming of a switching integral value for the tolerance based modulation takes into account an absolute amount of an arm current flowing through the series circuit. A power converter has a control device that is configured to perform the method.

8 Claims, 2 Drawing Sheets

(56) References Cited

OTHER PUBLICATIONS

Kubera, Sascha et al: "Control of switching frequency for modular multilevel converters by a variable hysteresis band modulation"; 2016 18th European Conference on Power Electronics and Applications (EPE'16 ECCE Europe); Jointly Owned by IEEE-PELS and EPE Association, Sep. 5, 2016 (Sep. 5, 2016), pp. XP032985414; DOI: 10.1109/EPE.2016.7695697.

Kuhn, Darl Capacitor Voltage Control Technique Fora Modular Converter Ed; ip.com, ip.com Inc., West Henrietta, NY, US; Jun. 10, 2015; XP013167653; ISSN: 1533-0001.

\* cited by examiner

HYSTERETIC CONTROL USING ARM CURRENT AND ERROR VOLTAGE IN A MODULAR MULTILEVEL CONVERTER

CROSS-REFERENCE TO RELATED APPLICATION

This application claims the priority, under 35 U.S.C. § 119, of European Patent Application EP 22154134.5, filed Jan. 31, 2022; the prior application is herewith incorporated by reference in its entirety.

FIELD AND BACKGROUND OF THE INVENTION

The invention relates to a method for operating a power converter having at least one series circuit of switching modules, which each have semiconductor switches and an energy store.

Published, European patent application EP 3 713 073 A1, corresponding to U.S. Pat. No. 11,277,076, for example, discloses a method of this type. In the known method, a switching frequency controller is used during operation of the power converter to adjust the switching frequency, and hence the switching losses, according to the operating point. To do this, deviations between currently set voltage and setpoint voltage are calculated and integrated over time, forming a switching integral value. A switching operation is triggered when an integral limit value is exceeded or not reached. In particular, when the upper integral limit value is exceeded, at least one switched-off switching module is switched on or, in the case of bipolar-switchable switching modules (such as full-bridge switching modules), a negatively turned-on switching module is switched off (turned off). Conversely, when the lower integral limit value is not reached, at least one switched-on switching module is switched off (in the case of full-bridge switching modules, a switching module can be switched on with negative polarity). The two integral limit values, or the difference thereof, thereby define a permitted voltage deviation range. The larger the voltage deviation range, the lower the resultant (mean) switching frequency. Reducing the integral limit value increases the switching frequency; correspondingly, increasing the integral limit value reduces the switching frequency. The known method is usually referred to as tolerance based modulation (TBM).

It is known that during operation of power converters, losses arise that depend primarily on conduction losses and the aforementioned switching losses of the switching modules used. In transmission network applications, these losses increase the operating costs. At the same time, there is a requirement for optimum operating performance in terms of harmonics and distortion, and therefore a trade-off must be made between total harmonic distortion and losses during operation of the power converter. The aforementioned switching losses cannot be reduced arbitrarily without increasing a voltage imbalance between the switching modules of a power-converter arm. A low switching frequency leads in particular to individual switching modules sometimes remaining longer in the current path, increasing the imbalance. In the event of a fault, this imbalance leads to a potentially lower energy intake capability of the switching modules (before the protective limits thereof are reached). For the design, this usually leads to a disadvantageous increase (in terms of production and operating costs) in the number of installed switching modules. In addition, the imbalance can sometimes shorten the operating life of the switching modules and hence of the entire power converter.

SUMMARY OF THE INVENTION

The object of the invention is to define a method of the type in question that makes it possible to operate the power converter as reliably as possible.

The object is achieved according to the invention by a method for operating a power converter having at least one series circuit of switching modules, which each have semiconductor switches and an energy store, in which method a switching frequency of the switching modules is controlled by means of tolerance based modulation, and the forming of a switching integral value for the tolerance based modulation takes into account an absolute amount of an arm current flowing through the series circuit. The series circuit of the switching modules can be suitably connected between a DC voltage pole and an AC voltage terminal of the power converter, thereby forming a power-converter arm.

In order to form the switching integral value, a voltage deviation is expediently calculated as a difference between a voltage setpoint and an ascertained actual voltage value. The actual voltage value is suitably a sum of the measured energy-store voltages of the switching modules, i.e. of the voltages across the energy store of each of the switching modules of all switched-on switching modules (in the power-converter arm or branch concerned). The voltage deviation is then integrated over time (suitably in the sense of a sum over specified successive sampling time points), forming the switching integral value. It should be noted here that the voltage error value or voltage deviation, and hence also the switching integral value, can assume both positive and negative values. The upper integral limit value defines the maximum permitted value of the switching integral value; the lower integral limit value defines the minimum permitted value of the switching integral value. In this context, permitted means that when the (instantaneous) switching integral value exceeds the upper integral limit value, at least one switched-off switching module is switched on or, in the case of bipolar-switchable switching modules (such as full-bridge switching modules), a negatively switched-on switching module is switched off (turned off). Conversely, when the lower integral limit value is not reached, at least one switched-on switching module is switched off (or, in the case of full-bridge switching modules, a switching module is switched on in a negative sense). The two integral limit values, or the difference thereof, thereby define a permitted voltage deviation range. The larger the voltage deviation range, the lower the resultant (mean) switching frequency (for instance because it takes more sampling time points before the switching integral value exceeds the integral limit value).

Taking account of the arm current in calculating the switching integral value means that, in the region in which the energy intake/output, or rather the arm current, is high, the error integral is moved correspondingly faster towards the integral limit. The local switching frequency is thereby increased correspondingly. It can be ensured by means of a switching-frequency controller that the overall switching frequency does not exceed the desired value. The method according to the invention advantageously makes it possible to balance the voltages of the switching modules more efficiently (avoid voltage imbalance). The efficient balancing can even reduce the overall switching frequency and hence also the switching losses in the power converter.

By means of a local increase (concerning only some of the switching modules within a given timespan within a line period) in the switching frequency, it is possible to reduce a voltage imbalance in particular also when this increase is produced during a high energy input, before critical points for the design (arm voltage peaks etc.) or during an energy-limited region, if the arm current has DC components, and hence submodules are either discharged or charged more frequently within a line period.

Taking account of the arm current can be realized in a simple manner in that the forming of the switching integral value contains multiplying the voltage deviation by an arm-current dependent gain factor. The gain factor can be selected here in such a way that it rises with a higher arm current. In particular, the arm-current dependent gain factor can be a linear or affine function of the absolute amount of the arm current. For example, a gain factor F can be defined by the formula $F(Ia)=a*|Ia|+1$, where Ia is the arm current and a is a parameter to be suitably selected. From $a>0$, it follows that $F>1$ always holds.

A minimum ON time can be reduced for at least one switching module as a further measure for reducing the costs and increasing the reliability of the power converter operation. Positive attenuation of interference is needed to ensure the safe operation of converters. Normally there are relevant resonances in networks in the range of 1 kHz to 5 kHz. These resonances are characteristic of the particular configuration of the AC network, i.e. the specific connection of sub-networks into an interconnected network. As a result of unavoidable time delays in the measurement and/or control and/or modulation, negative attenuation (=gain) is often produced in the range 2 kHz-4 kHz. The requirement for the control to respond to faults as quickly as possible, i.e. to work at a highest possible control gain, means that it is not possible to reduce the gain of the control in order to achieve greater attenuation in the system.

Attempts have previously been made to find a trade-off between FRT performance and attenuation in the control. Alternatively, suitable hardware filters must be built in order to achieve sufficient attenuation in the system. A further possible solution is to prohibit certain configurations of the AC network. All these solutions, however, have the disadvantage of constraining or increasing the cost of the area of use of the solution. The minimum ON time is the time that an individual module cannot change state, which means implicitly a maximum switching frequency per module. It is determined in particular by the thermal design of the switching module, the time needed to remove the charge carriers in the semiconductor concerned, and the time needed to restore the switching capability of the switching module. A new degree of freedom arises thanks to the proposed reduction in the minimum ON time. The value of the minimum ON time can be selected such that the equivalent filter action strongly attenuates the selected resonant frequency. The reduction in the minimum ON time allows a local increase (confined to the switching modules concerned) in the switching frequency, thereby allowing better attenuation of high frequency components of the interference (because the control can respond more quickly there). The optimum value for the minimum ON time can be obtained, for example, from the relationship n/(frequency for attenuation), where n is a member of $\{1,2,3\}$. A further possible implementation of the concept would be conceivable by adding a highly frequency-selective notch filter in the setpoint.

In the power-converter control, it is conceivable to use instead of setpoint values specified by a higher-level instance and/or measured actual values, those values that the power converter itself determines by means of a prediction function. Interference and faults resulting from the time delays can thereby be reduced or avoided. For example, in order to form the switching integral value, a predicted voltage setpoint can be used instead of the voltage setpoint, and/or a predicted actual voltage value can be used instead of the measured actual voltage value (the same applies also to current values). Hence the power-converter control does not wait to receive the setpoint values or actual values, but instead determines predicted setpoint or actual values on the basis of past ("true") setpoint and actual values. The control can advantageously compensate a delay during stationary operation. In addition, the response by the control during transient processes remains just as fast. The predicted setpoint or actual values can then be suitably compared or checked with the real setpoint or actual values in order to avoid the prediction drifting away from the real network state, or to recognize a transient state.

The invention also relates to a power converter having at least one series circuit of switching modules, which each have semiconductor switches and an energy store.

The aforementioned published, European patent application EP 3 713 073 A1 discloses a power converter of this type. The power converter can comprise power-converter arms, which are each connected between a DC pole and an AC terminal or else between two AC terminals. The series circuit of the switching modules is arranged in one of the power-converter arms. The power converter can be configured to convert a DC voltage into an AC voltage (and vice versa). The power converter can also be configured, however, for frequency conversion or for stabilizing an AC voltage network. The power converter usually contains a control device. Control parameters of the power converter can be controlled by means of the control device. Control parameters may be a voltage, a current or a power, for example. In particular it is possible to control an arm voltage, i.e. the voltage across one of the power-converter arms. Such a power converter is often called a modular multilevel converter.

The object of the invention is to define a power converter of the type in question that is as inexpensive and reliable in operation as possible.

The object is achieved for a power converter of the type in question by a control device that is configured to perform a method according to the invention.

The advantages of the power converter according to the invention are gathered in particular from the advantages that have already been described in connection with the method according to the invention.

At least some of the switching modules, preferably all the switching modules, are half-bridge switching modules.

Other features which are considered as characteristic for the invention are set forth in the appended claims.

Although the invention is illustrated and described herein as embodied in a power converter and a method for operating the power converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
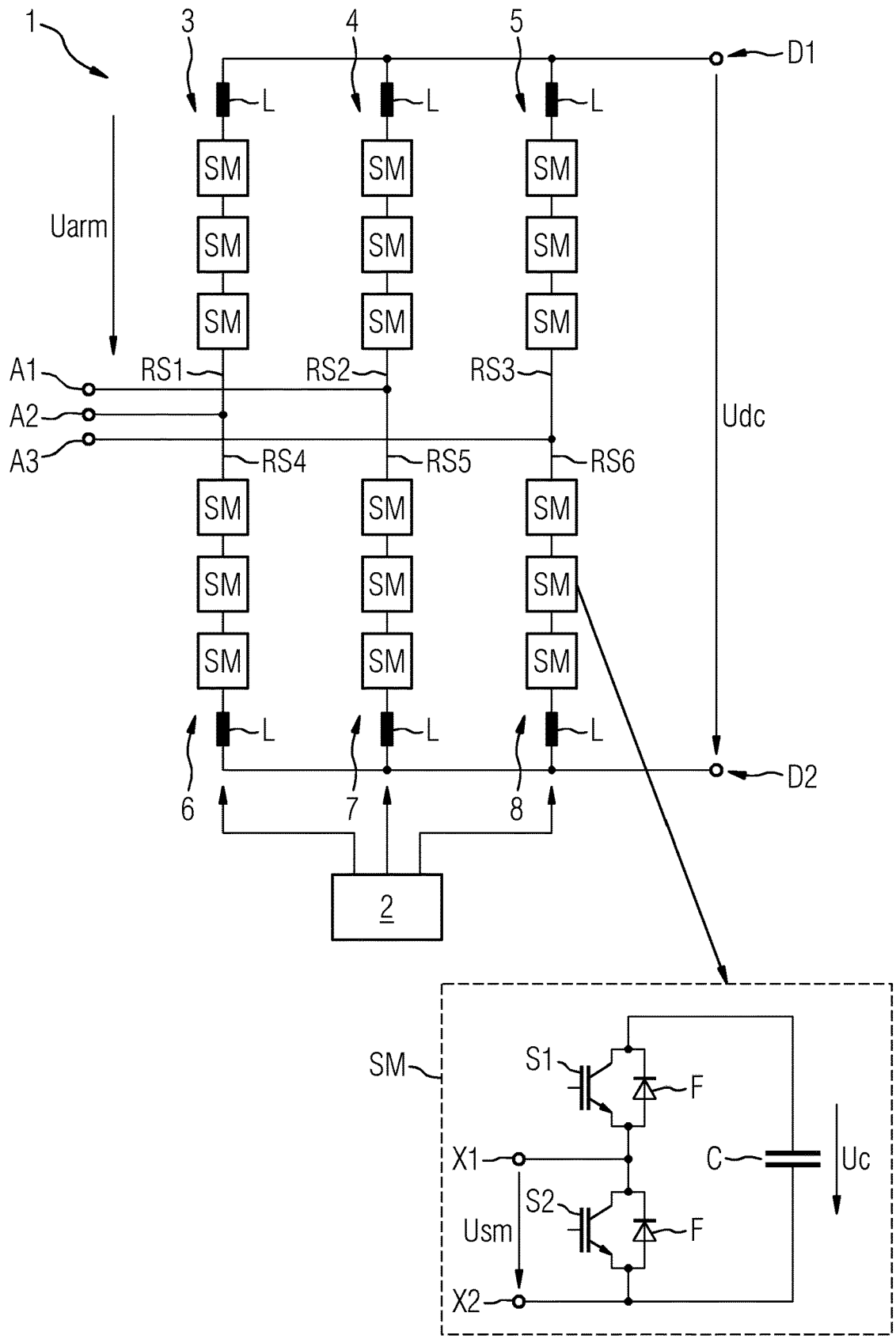
FIG. 1 is a schematic diagram of an exemplary embodiment of a power converter according to the invention.

Referring now to the figures of the drawings in detail and first, particularly to FIG. 1 thereof, there is shown a power converter 1 which is often called a modular multilevel converter (MMC). The power converter 1 contains six power-converter arms 3-8 having series circuits RS1-RS6, each of which contains a multiplicity of switching modules SM, and having an inductance L (arm inductor). In the example shown, the MMC is configured to convert an AC voltage of an AC voltage network, to which the MMC 1 can be connected by means of terminals A1-A3 and a power transformer, for example, into a DC voltage UDC (or vice versa). The power converter 1 can be connected by means of the terminals D1, D2 to a DC voltage network or to a DC voltage line. The power converter 1 further contains a control device 2, which is configured for power-converter control. Current, voltage, power and frequency can be controlled by means of the control device 2. For example, the control device 2 can be used to control an arm voltage Uarm, where the arm voltage Uarm denotes the voltage across the first power-converter arm 3.

In the example shown in FIG. 1, all the switching modules SM have the same configuration. In principle, however, it is also conceivable that differently configured switching modules are used in one and the same power converter, for instance half-bridge switching modules and full-bridge switching modules. The switching module SM contains a capacitor branch, in which is arranged a first semiconductor switch S1, which has an anti-parallel freewheeling diode F, in series with an energy store C. In a bridge branch between two terminals X1, X2 of the switching module SM is arranged a second semiconductor switch S2, which has an anti-parallel freewheeling diode F. A switching module voltage Usm, which equals the capacitor voltage Uc or else a zero voltage, can be produced at the terminals X1, X2 by driving the two semiconductor switches S1, S2 in a suitable manner.

Figure 2:
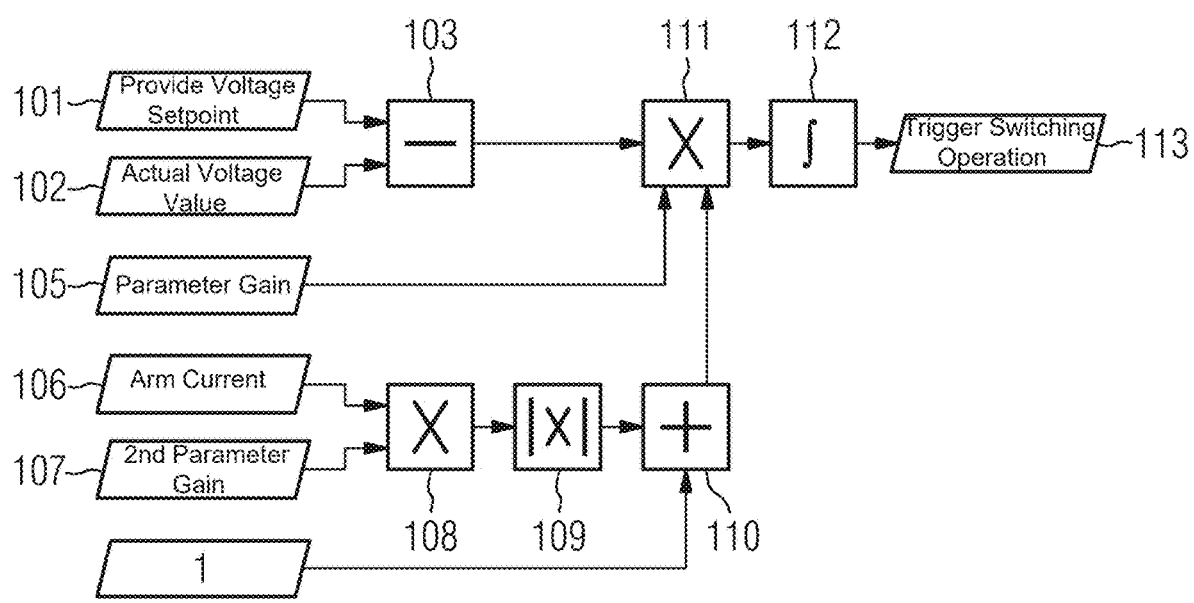
FIG. 2 is a schematic diagram of an exemplary embodiment of a method according to the invention.

FIG. 2 shows a flow diagram of part of the power-converter control. In a first method step 101, a voltage setpoint Ua* is provided for the power-converter arm concerned. In a second method step 102, a (ascertained or measured) actual voltage value Ua is provided for the power-converter arm concerned. In a third method step 103 a voltage deviation DeltaU=Ua−Ua* is formed. In a fourth method step, the voltage deviation is transferred to a multiplier. In a fifth method step 105, a first parameter gain1 is provided.

In a sixth method step 106, an arm current Ia flowing in the power-converter arm concerned is provided. In a seventh method step 107, a second parameter gain2 is provided. In an eighth method step 108, the arm current Ia is multiplied by the second parameter gain2. In a ninth method step 109, an absolute amount of the product is formed. In a tenth method step 110, a one is added to the value of the absolute amount, forming an arm-current dependent gain factor.

In an eleventh method step 111, the voltage deviation DeltaU is multiplied by the first parameter gain1 and by the arm-current dependent gain factor. In a twelfth method step 112, the voltage deviation DeltaU is integrated, forming a switching integral value (the individual values of the voltage deviation ascertained successively in time are added to one another). As soon as the switching integral value Is exceeds an integral limit value, a switching operation is triggered, in a thirteenth method step 113, at one of the switching modules of the power-converter arm concerned.

The invention claimed is:

1. A method for operating a power converter having at least one series circuit of switching modules, each of the switching modules having semiconductor switches and an energy store, which comprises the steps of:
   controlling a switching frequency of the switching modules by means of hysteresis-based control; and
   forming a switching integral value for the hysteresis-based control taking into account an absolute amount of an arm current flowing through the at least one series circuit, wherein the step of forming of the switching integral value includes summing at successive time points a voltage deviation as a difference between a voltage setpoint and an ascertained actual voltage value and multiplying the voltage deviation by an arm-current dependent gain factor.

2. The method according to claim 1, wherein the arm-current dependent gain factor is a linear function of the absolute amount of the arm current.

3. The method according to claim 1, which further comprises reducing a minimum ON time for at least one of the switching modules.

4. The method according to claim 1, wherein in order to form the switching integral value, a predicted voltage setpoint is used instead of the voltage setpoint, and/or a predicted actual voltage value is used instead of the actual voltage value.

5. The method according to claim 1, wherein it is ensured by means of higher-level switching-frequency control that an overall switching frequency does not exceed a predetermined maximum value.

6. The method according to claim 1, wherein the forming of the switching integral value also takes into account arm voltage peaks.

7. A power converter, comprising:
   at least one series circuit of switching modules, each of said switching modules having semiconductor switches and an energy store; and
   a controller configured to:
      control a switching frequency of said switching modules by means of hysteresis-based control; and
      form a switching integral value for the hysteresis-based control taking into account an absolute amount of an arm current flowing through the at least one series circuit, wherein the forming of the switching integral value includes summing at successive time points a voltage deviation as a difference between a voltage setpoint and an ascertained actual voltage value and multiplying the voltage deviation by an arm-current dependent gain factor.

8. The power converter according to claim 7, wherein at least some of said switching modules are half-bridge switching modules.

* * * * *